(12) United States Patent
Grissom et al.

(10) Patent No.: US 11,846,358 B1
(45) Date of Patent: Dec. 19, 2023

(54) LOW-PROFILE PROPORTIONAL COOLANT VALVE

(71) Applicant: Hanon Systems, Daejeon (KR)

(72) Inventors: Emma Michelle Grissom, Howell, MI (US); Jason Dale Perkins, Dexter, MI (US); Sunil Kumar Harihar Onkarachari, Mississauga (CA)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 17/814,944

(22) Filed: Jul. 26, 2022

(51) Int. Cl.
*F16K 11/085* (2006.01)
*F16K 27/06* (2006.01)

(52) U.S. Cl.
CPC ........ *F16K 11/0853* (2013.01); *F16K 27/065* (2013.01)

(58) Field of Classification Search
CPC . F16K 11/0853; F16K 27/065; F16K 11/0833
USPC .................................................. 251/310–312
See application file for complete search history.

(56) References Cited

U.S. PATENT DOCUMENTS

| | | | | |
|---|---|---|---|---|
| 6,196,266 B1 * | 3/2001 | Breda | ................ | F16K 11/0853 |
| | | | | 137/454.6 |
| 8,146,884 B2 * | 4/2012 | Yli-Koski | ................ | F16K 5/12 |
| | | | | 137/625.3 |
| 10,612,688 B2 * | 4/2020 | Kuwagaki | ............... | F16L 57/00 |

* cited by examiner

*Primary Examiner* — Michael R Reid
(74) *Attorney, Agent, or Firm* — Shumaker, Loop & Kendrick, LLP; James D. Miller (57) ABSTRACT

A rotary valve includes a rotary valve body defining a passageway from a first passageway port at an axial end surface of the rotary valve body to a second passageway port at an outer circumferential surface thereof. A valve housing has an inner surface defining each of an opening rotatably receiving the rotary valve body therein, a first housing port through which a fluid flows transverse to the axis of rotation of the rotary valve body, and a second housing port through which the fluid flows transverse to the axis of rotation of the rotary valve body. A flow path is formed between the inner surface of the valve housing and the outer surface of the rotary valve body with the flow path providing fluid communication between the first housing port of the valve housing and the first passageway port of the rotary valve housing.

19 Claims, 5 Drawing Sheets

LOW-PROFILE PROPORTIONAL COOLANT VALVE

FIELD OF THE INVENTION

The invention relates to a rotary valve, and more particularly, a low-profile valve housing of a rotary diverter valve defining a flow path for directing a flow of fluid from a circumferentially disposed fluid port of the valve housing to an axially disposed fluid port of a rotary diverter rotatably disposed within the valve housing.

BACKGROUND

A rotary valve typically includes rotary valve body having a substantially cylindrical or conical outer surface that is received within a valve housing having a corresponding cylindrical or conical inner surface. The rotary valve body typically includes at least one passageway formed therethrough with at least one of the ends of each of the passageways intersecting the outer surface of the rotary valve body. Each of the passageways is configured to communicate a fluid through the rotary valve body with respect to any of a variety of different flow configurations. The valve housing in turn typically includes one or more ports intersecting the inner surface of the valve housing in order to communicate the fluid between any combination of the ports of the valve housing and the passageways of the rotary valve body. The rotary valve body is operatively connected to a rotary actuator configured to rotate the rotary valve body relative to the stationary valve housing to cause a repositioning of each of the passageways relative to each of the stationary ports. Depending on the configuration of the rotary valve body and the valve housing, such rotation of the rotary valve body relative to the valve housing may switch which of the passageways are placed in fluid communication with the corresponding ports, including distributing the fluid proportionally to multiple different ports, or may cease flow through at least one of the passageways by placing the at least one of the passageways in alignment with a portion of the inner surface of the valve housing devoid of one of the ports.

In some circumstances, such rotary valves include one of the ends of one of the passageways formed through the rotary valve body intersecting an axial end surface of the rotary valve body along an axis of rotation thereof. The valve housing rotatably receiving the rotary valve body therein may in turn include a corresponding one of the ports thereof axially aligned with the axis of rotation of the rotary valve body and extending from the valve housing in parallel to the axis of rotation. This configuration allows flow from the axially aligned port to enter the axially aligned end of the passageway of the rotary valve body before undergoing a 90 degree turn for flowing in a direction perpendicular to the axis of rotation. The turned flow can then be distributed to one or more corresponding circumferential ports of the valve housing, each of which may extend perpendicularly to the axis of rotation from a circumferential wall of the valve housing.

The described configuration is beneficial when it is desirable to switch the rotary valve between different rotational positions thereof for switching which of the two or more perpendicular arranged circumferential ports receives the flow of the fluid from the axially aligned port, or which combination thereof (in certain circumstances). The fluid undergoes a substantially identical 90 degree turn in flow direction when passing through the passageway of the rotary valve body regardless of the rotational position thereof, thereby ensuring that the flow characteristics of the fluid are altered similarly when passing through the passageway with respect to each rotational position of the rotary valve. Such an axial to radial flow configuration may be utilized in a proportional diverter valve, as one non-limiting example.

However, one disadvantage of this configuration results from the need for the axially aligned port to extend perpendicularly away from a plane defined by the circumferential ports, which significantly increases an axial dimension of the resulting rotary valve. This increase in axial dimension is further frustrated by the potential introduction of fluid lines extending away from each of the ports. The described configuration accordingly occupies a relatively large packaging space with the need for multiple different fluid lines to be routed at multiple different perpendicular arranged orientations. In many circumstances, it can be difficult to accommodate such a valve configuration within the limited packaging constraints of a motor vehicle or the like where such a rotary diverter valve may normally be employed.

Accordingly, there exists a need in the art to produce a rotary valve having an alternative flow configuration therethrough via the elimination of an axially extending fluid port from a valve housing of the rotary valve, thereby reducing a packaging space of the rotary valve.

SUMMARY OF THE INVENTION

According to an embodiment of the present invention, a rotary valve includes a rotary valve body configured to rotate about an axis of rotation thereof. The rotary valve body defines a passageway therethrough that extends from a first passageway port formed at an axial end surface of the rotary valve body to a second passageway port formed at an outer circumferential surface of the rotary valve body. A valve housing having an inner surface defines each of an opening rotatably receiving the rotary valve body therein, a first housing port providing an inlet or outlet for a fluid to flow into or out of the opening of the valve housing while flowing transverse to the axis of rotation of the rotary valve body, and a second housing port providing an inlet or outlet for the fluid to flow into or out of the opening of the valve housing while flowing transverse to the axis of rotation of the rotary valve body. A flow path is formed between the inner surface of the valve housing and the outer surface of the rotary valve body with the flow path providing fluid communication between the first housing port of the valve housing and the first passageway port of the rotary valve housing.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-4 illustrate a rotary valve 10 according to an embodiment of the present invention. The illustrated rotary valve 10 may alternatively be referred to as a "plug valve," or "diverter valve," as desired. The rotary valve 10 as shown and described herein may also be utilized for any number of different applications and for selectively conveying any variety of different fluids therethrough. As one example, the rotary valve 10 may be a proportional diverter valve as utilized in distributing a flow of a liquid coolant of an automotive-based fluid system. However, it should be readily apparent that the presently disclosed rotary valve 10 may be utilized in substantially any automotive application corresponding to the described flow configurations through the rotary valve 10, including the control of various fluids associated with operation of a hydraulic system, a pneumatic system, a fuel system, or a heating, ventilating, and air conditioning (HVAC) system of the associated vehicle or the like. In addition to a liquid coolant, the fluids suitable for use with the rotary valve 10 may be air, any hydraulic fluids, any types of fuel, or any refrigerants typically utilized with respect to such vehicular systems, as desired. However, it should also be apparent that the present rotary valve 10 may be adapted for use with any fluid associated with any fluid conveying system without necessarily departing from the scope of the present invention, and is accordingly not limited to automotive or vehicular applications.

The rotary valve 10 disclosed in FIGS. 1-4 generally includes a rotary valve body 20 (diverter), a valve housing 60, and at least one sealing assembly 90 for providing a fluid-tight seal between the rotary valve body 20 and the valve housing 60. The disclosed rotary valve 10 includes a substantially cylindrical rotary valve body 20 and a substantially cylindrical valve housing 60. The rotary valve body 20 is configured to rotate relative to the valve housing 60 about an axis of rotation thereof. The axis of rotation of the rotary valve body 20 extends through a center of the rotary valve body 20 and defines an axial direction thereof. The axis of rotation of the rotary valve body 20 also coincides with a central axis of the valve housing 60 as well as the rotary valve 10 more generally, hence subsequent references to an axial direction of any of the rotary valve 10, the rotary valve body 20, or the valve housing 60 refer to directions arranged parallel to the axis of rotation of the rotary valve body 20. Additionally, a radial direction of any one of the rotary valve 10, the rotary valve body 20, or the valve housing 60 may refer to any of the directions passing through and arranged perpendicular to the axis of rotation of the rotary valve body 20.

Figure 1:
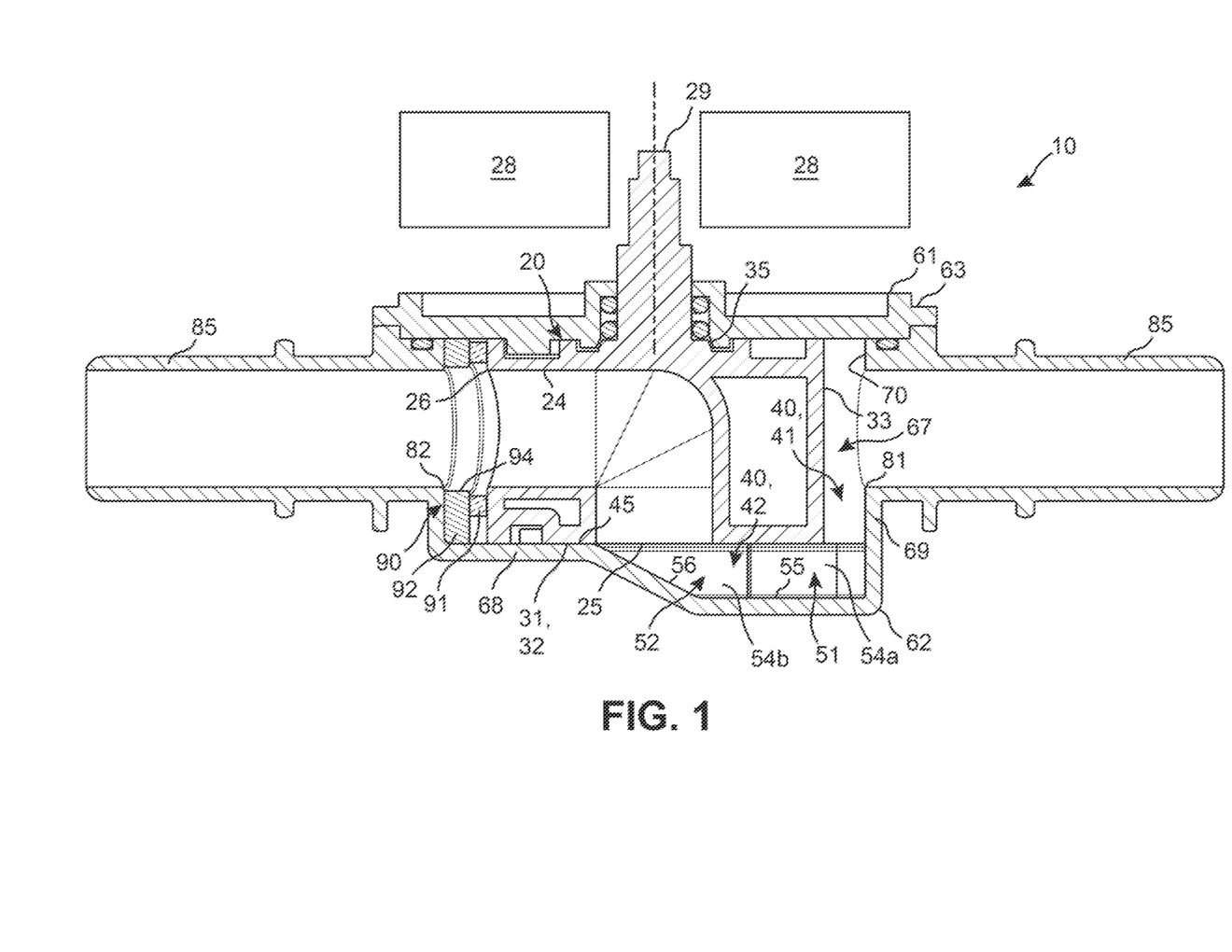
FIG. 1 is a cross-sectional elevational view of a rotary valve according to an embodiment of the present invention as taken through a plane arranged parallel to and including an axis of rotation of a rotary valve body of the rotary valve.

The rotary valve body 20 includes at least one passageway 24 formed therethrough. In the provided embodiment, the rotary valve body 20 includes a single passageway 24 extending from a first passageway port 25 to a second passageway port 26. As used herein, each passageway port 25, 26 is defined as an opening formed at an outer surface of the rotary valve body 20 that forms an inlet into or outlet out of the corresponding passageway 24. Each passageway port 25, 26 may be considered to represent a flow boundary between a flow space defining the passageway 24 within the rotary valve body 20 and a flow space disposed exterior to the rotary valve body 20 and the passageway 24.

The first passageway port 25 is formed at a first axial end 31 of the rotary valve body 20. More specifically, the first passageway port 25 is formed along a first axial end surface 32 of the rotary valve body 20, which may be provided in an axial end wall of the rotary valve body 20. The first passageway port 25 is arranged in a manner wherein flow into or out of the first passageway port 25 occurs in a direction parallel to the axial direction of the rotary valve body 20. The first passageway port 25 may include a circular cross-sectional flow boundary shape that may be arranged perpendicular to the axis of rotation of the rotary valve body 20 while also being centered relative thereto. The centering of the first passageway port 25 relative to the axis of rotation results in the flow boundary shape of the first passageway port 25 remaining unchanged during rotation of the rotary valve body 20 relative to the stationary valve housing 60. The first passageway port 25 may accordingly form a flow boundary with respect to the axial direction of the rotary valve body 20 between the flow space defining the passageway 24 and a flow space disposed exterior to the passageway 24 and spaced axially therefrom outside of the rotary valve body 20.

In contrast, the second passageway port 26 is formed at an outer circumferential surface 33 of the rotary valve body 20, which may be provided as an outer surface of a cylindrically shaped circumferential wall of the rotary valve body 20. The second passageway port 26 defines a flow boundary that extends in each of the axial direction and the circumferential direction of the rotary valve body 20 at the outer circumferential surface 33 thereof. The second passageway port 26 may include a substantially circular or elliptical cross-sectional flow boundary shape when viewed along a central axis of the second passageway port 26, although other shapes may be utilized while remaining within the scope of the present invention. The second passageway port 26 is arranged such that flow into or out of the second passageway port 26 occurs in a direction transverse to the axial direction of the rotary valve body 20, which may include a direction perpendicular to the axial direction. Specifically, the flow through the second passageway port 26 may be arranged to occur in a radial direction of the rotary valve body 20 arranged perpendicular to the axial direction thereof. The second passageway port 26 may accordingly form a flow boundary with respect to the radial direction of the rotary valve body 20 between the flow space defining the passageway 24 and a flow space disposed exterior to the passageway 24 and spaced radially therefrom outside of the rotary valve body 20.

The disclosed passageway 24 accordingly includes a 90 degree change of direction of a fluid flowing between the first and second passageway ports 25, 26 while traversing the passageway 24. Specifically, when flowing from the first port passageway 25 to the second port passageway 26, a fluid flows axially through the first port passageway 25, turns 90 degrees to an outward radial direction of the rotary valve body 20 towards the second passageway port 26, and then exits the second passageway port 26 while continuing to flow in the outward radial direction. Flow in the opposing flow direction occurs in the same manner, but reversed in flow configuration.

The first passageway port 25 and the second passageway port 26 are shown as including the same profile shapes and diameters when viewed axially, but the ports 25, 26 may alternatively be provided with differing shapes and dimensions, as desired, for prescribing a desired change in flow characteristics of the fluid when flowing between the ports 25, 26. For example, the second passageway port 26 may include a different cross-sectional flow area in comparison to the first passageway port 25 such that the corresponding fluid undergoes a contraction or an expansion when passing through the passageway 24, thereby altering characteristics of the fluid, such as the pressure or flow rate thereof, when passing from one of the ports 25, 26 to the other of the ports 25, 26.

The rotary valve body 20 is operably coupled to a rotary motor or actuator 28 (shown schematically) configured to provide a torque necessary to rotate the rotary valve body 20 about the axis of rotation thereof relative to the stationary valve housing 60. The rotary motor or actuator 28 may be a torque motor, a servo motor, an electric stepper motor, or a brushless DC motor, as non-limiting examples. Any rotary motor or actuator having the necessary torque and the preciseness for establishing a desired rotational position of the rotary valve body 20 relative to the valve housing 60 may be selected without departing from the scope of the present invention. As shown in FIG. 1, the rotary valve body 20 may include an axially extending stem 29 disposed along the axis of rotation thereof for operationally engaging the corresponding rotary motor of actuator 28. The stem 29 may extend from a second axial end 35 of the rotary valve body 20 disposed opposite the first axial end 31 thereof having the first passageway port 25.

The valve housing 60 extends axially from a first end 61 to a second end 62 thereof. The first end 61 of the valve housing 60 includes a cover 63. The cover 63 may include an opening centered on the axis of rotation of the rotary valve body 20 with the opening configured to receive the stem 29 of the rotary valve body 20 therethrough. An O-ring or other gasket may be disposed between a rim of the valve housing 60 and an inner axial surface of the cover 63 to form a fluid-tight seal therebetween. Another pair of O-rings or other gaskets may be received between an inner circumferential surface of the cover 63 defining the opening thereof and an outer circumferential surface of the stem 29 of the rotary valve body 20 to similarly form a fluid-tight seal therebetween, including during periods of rotation of the rotary valve body 20 relative to the valve housing 60. However, alternative sealing arrangements may be present between the rotary valve body 20 and the valve housing 60 while remaining within the scope of the present invention, hence the described configuration is not limiting to the present invention.

The valve housing 60 further defines a substantially cylindrical opening 67 formed therein with the opening 67 extending from an inner facing surface of the cover 63 at the first end 61 of the valve housing 60 to an axial end wall 68 formed at the second end 62 thereof. The cover 63 and the axial end wall 68 may each be arranged substantially perpendicular to the rotary valve body 20 at each of the opposing ends 31, 35 thereof, and may each be substantially circular in peripheral shape. A circumferential wall 69 of the valve housing 60 extends axially to connect the cover 63 to the axial end wall 68, and may be substantially cylindrical in shape. The axial end wall 68 is configured to engage an axial end of the rotary valve body 20 and the circumferential wall 69 is configured to surround the rotary valve body 20 when the rotary valve body 20 is rotatably received within the valve housing 60.

The circumferential wall 69 of the valve housing 60 includes an inner circumferential surface 70 extending peripherally around the rotary valve body 20. The inner circumferential surface 70 may be substantially cylindrical in shape and may include a plurality of radial wall segments 71 spaced apart circumferentially about the inner circumferential surface 70. Each of the radial wall segments 71 may extend radially inwardly to a position substantially corresponding to the outer circumferential surface 33 of the rotary valve body 20. The portions of the inner circumferential surface 70 interposed between the radial wall segments 71 are spaced a radial distance from the facing portion of the outer circumferential surface 33 of the rotary valve body 20.

A pocket is defined between the outer circumferential surface 33 of the rotary valve body 20 and the inner circumferential surface 70 of the valve housing 60 between adjacent sets of the radial wall segments 71. Each of the pockets may have a shape of an angular segment of an annulus when viewed from the axial direction of the valve housing 60, wherein each angular segment corresponds to about 75 degrees along each of the circumferential surfaces 33, 70 with respect to the axis of rotation of the rotary valve body 20. However, each of the pockets may occupy an alternative angular displacement while remaining within the scope of the present invention. At least one of the pockets is configured to receive one of the sealing assemblies 90 therein, as explained in detail hereinafter.

Figure 3:
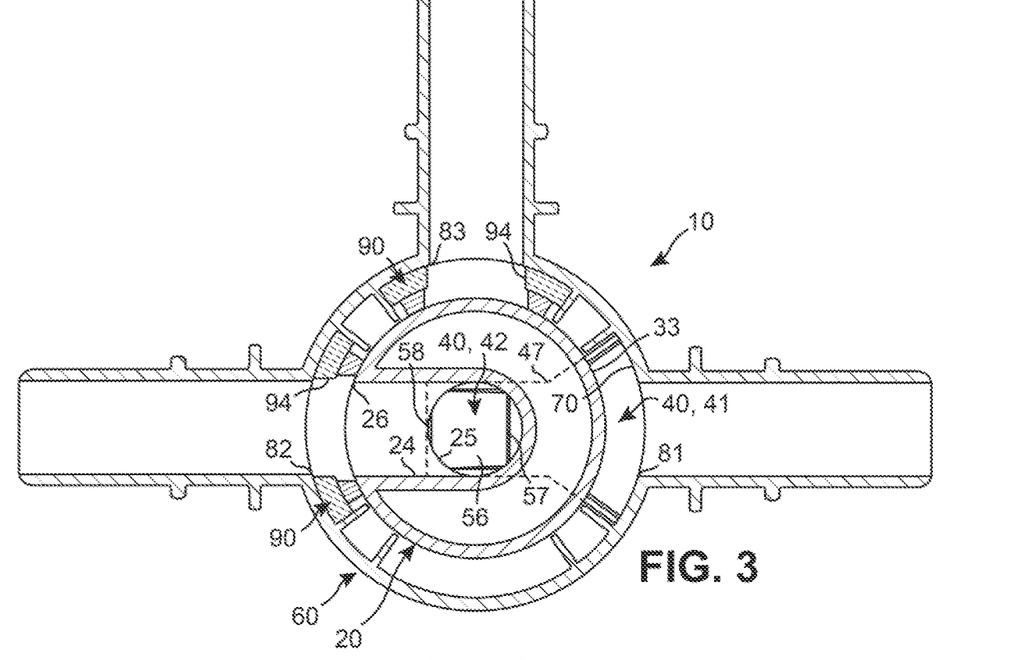
FIG. 3 is a cross-sectional view taken through a plane arranged parallel to and including a central axis of each of three different housing ports of the valve housing, wherein the rotary valve body is shown at a first rotational position relative to the valve housing for prescribing a first flow configuration through the rotary valve.
Figure 4:
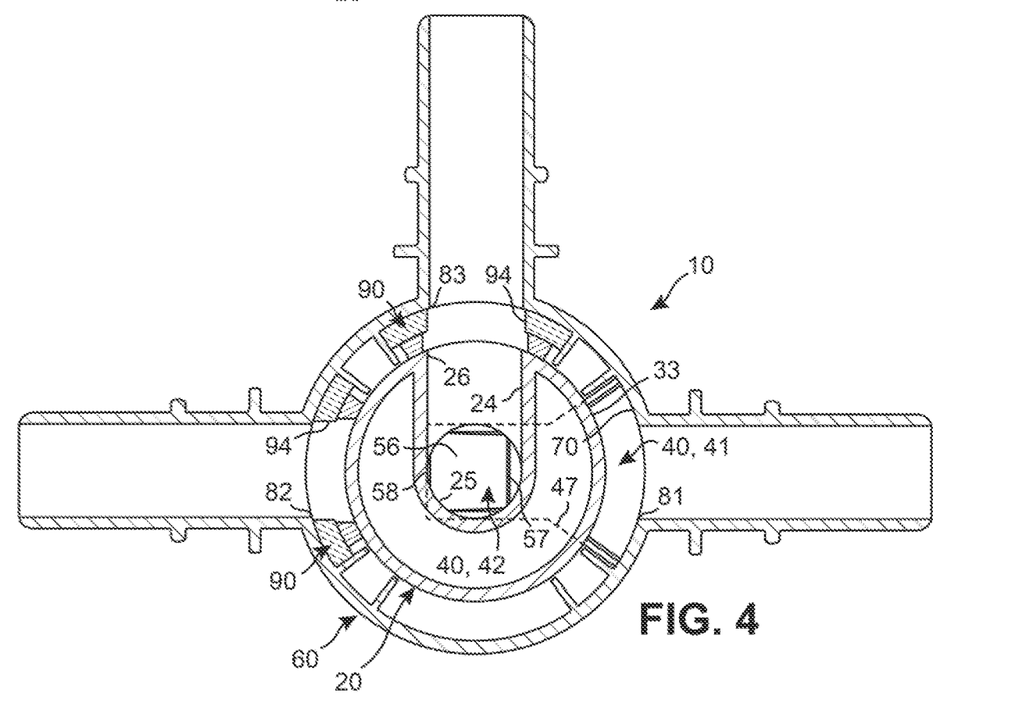
FIG. 4 is a cross-sectional view taken from the same perspective as FIG. 3, wherein the rotary valve body is shown at a second rotational position relative to the valve housing for prescribing a second flow configuration through the rotary valve.

The valve housing 60 includes a plurality of housing ports 81, 82, 83 formed therein for communicating a fluid to or from the rotary valve 10. More specifically, each housing port 81, 82, 83 is defined as a flow opening formed at the inner surface of the valve housing 60 forming an inlet into or outlet out of the opening 67 into which the rotary valve body 20 is rotatably received. Each of the housing ports 81, 82, 83 accordingly provides a flow space through which a fluid can flow to one of the corresponding passageway ports 25, 26 of the rotary valve body 20. Each housing port 81, 82, 83 may be considered to represent a flow boundary between a flow space disposed within the opening 67 at a position exterior to the passageway 24 of the rotary valve body 20 and a flow space disposed exterior to the opening 67.

Each of the housing ports 81, 82, 83 of the present invention is formed at the inner circumferential surface 70 of the valve housing 60 as a radially inwardly disposed terminal end of a corresponding conduit 85 of the valve housing 60. Each of the conduits 85 extends longitudinally in the direction of flow of the fluid into or out of the corresponding one of the housing ports 81, 82, 83, which in the present invention corresponds to a plurality of angularly displaced radial directions of the rotary valve body 20. Each of the conduits 85 may extend radially outwardly from the circumferential wall 69 of the valve housing 60, and may include a circular cross-sectional flow shape, thereby resulting in each of the housing ports 81, 82, 83 having a circular profile shape when viewed from the corresponding radial direction of the rotary valve body 20.

Each of the conduits 85 may form a fluid coupling, fitting, adapter, or the like for engaging an adjacent fluid conveying component, conduit, hose, pipe, or the like of the corresponding fluid system. However, the valve housing 60 may be provided devoid of the conduits 85, so long as each of the housing ports 81, 82, 83 includes flow into or out of the opening 67 of the valve housing 60 at positions distributed at the inner circumferential surface thereof 70 and at positions disposed radially outwardly of the outer circumferential surface 33 of the rotary valve body 20 such that the flow towards or away from the rotary valve body 20 is at least partially in a radial direction of the rotary valve body 20 when entering or exiting the opening 67.

In some embodiments, each of the housing ports 81, 82, 83 includes a central axis thereof arranged on a common plane arranged perpendicular to the axis of rotation of the rotary valve body 20. The second passageway port 26 may also include a central axis arranged on such a common plane. In other embodiments, an axial position of the central axis of at least one of the housing ports 81, 82, 83 may vary from the remaining housing ports 81, 82, 83, so long as each of the housing ports 81 directs flow towards the rotary valve body 20 in a direction transverse to the axis of rotation thereof and at a position disposed directly radially outward of the outer circumferential surface 33 of the rotary valve body 20, thereby ensuring a minimized dimension of the rotary valve 10 with respect to the axial direction thereof via the disclosed arrangement of each of the housing ports 81, 82, 83 and the associated conduits 85.

In the illustrated embodiment, the valve housing 60 includes three of the housing ports 81, 82, 83 with the first housing port 81 arranged diametrically opposed to the second housing port 82, which corresponds to the first and second housing ports 81, 82 being spaced circumferentially (angularly) by a 180 degree displacement relative to the axis of rotation of the rotary valve body 20. The third housing port 83 is shown as being spaced equally from each of the first housing port 81 and the second housing port 82 with respect to the circumferential direction, which corresponds to the third housing port 83 being circumferentially (angularly) displaced 90 degrees relative to each of the adjacent housing ports 81, 82 while being disposed therebetween.

However, the valve housing 60 may include an alternative circumferential (angular) spacing present between adjacent ones of the housing ports 81, 82, 83 while remaining within the scope of the present invention, as desired. Such an alternative spacing may be present when additional housing ports 81, 82, 83 are necessary in the circumferential wall 69 for achieving the desired flow configurations through the rotary valve body 20, which may be associated with the rotary valve body 20 being adjustable to a plurality of additional rotational positions corresponding to such variable flow configurations. The housing ports 81, 82, 83 may also be distributed alternatively when it is desired to proportionally distribute the fluid from the passageway 24 of the rotary valve body 20 to each of two of the adjacent housing ports, such as the second and third housing ports 82, 83 of the present embodiment. For example, such a distribution may include a circumferential widening of the second passageway port 26 and a closer circumferential (angular) spacing present between the second and third housing ports 82, 83, such as 45 degrees, thereby allowing for the second passageway port 26 to radially align at least partially with each of the second and the third housing ports 82, 83 for distributing the fluid to each of the distinct housing ports 82, 83 via the second passageway port 26.

The second and third housing ports 82, 83 are each configured for selective fluid communication with the passageway 24 of the rotary valve body 20 via the second passageway port 26 formed at the outer circumferential surface 33 thereof. Specifically, the rotary valve body 20 is configured to be rotatably adjustable such that the second passageway port 26 is configured to be selectively radially aligned with one of the second or third housing ports 82, 83 for achieving different flow configurations through the rotary valve 10. In contrast, the first housing port 81 is not configured for selective fluid communication with the second passageway port 26 along the outer circumferential surface 33 of the rotary valve body 20, and is instead always configured for fluid communication with the first passageway port 25 via a flow path 40 formed between the inner surface of the valve housing 60 defining the opening 67 thereof and the outer surface of the rotary valve body 20, as explained in greater detail hereinafter.

The manner in which the passageway 24 of the rotary valve body 20 is switchable to be placed in selective fluid communication with each of the second and the third housing ports 82, 83 via the second passageway port 26 results in the need for one of the sealing assemblies 90 to be present within each of the pockets corresponding to the second and third housing ports 82, 83. Each of the sealing assemblies 90 may include a first sealing structure 91 and a second sealing structure 92. The first sealing structure 91 may alternatively be referred to as the "hard" sealing structure 91 while the second sealing structure 92 may alternatively be referred to as the "soft" sealing structure 92, as desired. The hard sealing structure 91 may be formed from a substantially rigid material, such as a thermoplastic, whereas the soft sealing structure 92 may be formed from a relatively soft and elastic material, such as an elastomeric material.

The hard sealing structure 91 is configured to directly engage the outer circumferential surface 33 of the rotary valve body 20 to provide a fluid-tight seal therebetween when the rotary valve body 20 is rotated to any of the different prescribed positions thereof for causing any of the prescribed flow configurations through the rotary valve 10. More specifically, the hard sealing structure 91 is configured to surround and form a fluid-tight seal around a periphery of the second passageway port 26 is placed in radial alignment with the hard sealing structure 91. In contrast, the soft sealing structure 92 is configured to directly engage the circumferential wall 69 of the valve housing 60 within one of the pockets 72 thereof to provide a fluid-tight seal therebetween. More specifically, the soft sealing structure 92 is configured to surround and form a fluid-tight seal around a periphery of the corresponding one of the housing ports 82, 83 of the valve housing 60 at the inner circumferential surface 70 thereof. Additionally, the hard sealing structure 91 is also configured to engage the soft sealing structure 92 to form a fluid-tight seal therebetween at positions where the sealing structures 91, 92 are placed in direct contact with each other. As such, each of the sealing assemblies 90 provides a fluid-tight seal between the second passageway port 26 and the instantaneously aligned one of the housing ports 82, 83 to allow for radial flow of the fluid therebetween. The hard sealing structure 91 and the soft sealing structure 92 of each of the sealing assemblies 90 extends peripherally around the circular profile shape of the corresponding one of the housing ports 82, 83 to form a substantially cylindrical flow opening 94 through each of the sealing assemblies 90, wherein such a flow opening 94 provides the selective fluid communication between the second passageway port 26 and the instantaneously aligned one of the housing ports 82, 83 with respect to the corresponding radial direction of the rotary valve body 20.

Each of the sealing assemblies 90 may alternatively be provided as a single sealing element, or a contrary arrangement of sealing elements, so long as the desired flow path and necessary seal is formed between the passageway 24 of the rotary valve body 20 and each of the corresponding housing ports 82, 83 of the rotary valve 10 as described herein when adjusting the rotary valve 10 to different operational configurations thereof.

As mentioned previously, the first housing port 81 is distinguished from the second and third housing ports 82, 83 by being configured to always be in fluid communication with the first passageway port 25 disposed at the axial end surface 32 of the rotary valve body 20. Such fluid communication accordingly requires a routing of the flow of the fluid between the ports 25, 81 through the previously mentioned flow path 40 formed within the valve housing 60. The flow path 40 is provided as a continuous path through the opening 67 defined by the valve housing 60 at positions disposed between the outer surface of the rotary valve body 20 and the inner surface of the valve housing 60 defining the limits of the opening 67.

The relative positioning and contrary angular orientations present between the different ports 25, 81 further requires the flow path 40 to include two distinct segments 41, 42 between the ports 25, 81 for routing the fluid both axially and radially around the rotary valve body 20. The first segment 41 of the flow path 40 is formed by a flow space present directly between the outer circumferential surface 33 of the rotary valve body 20 and the inner circumferential surface 70 surface of the valve housing 60 with respect to the radial direction of the rotary valve body 20. The second segment 42 of the flow path 40 is formed by a flow space present beyond the outer circumferential surface 33 of the rotary valve body 20 with respect to the axial direction thereof, and is hence disposed adjacent an axial end of the first segment 41 with respect to the axial direction of the rotary valve body 20. The first segment 41 is configured to direct a flow of the fluid in the axial direction of the rotary valve body 20 while the second segment 42 is configured to direct a flow of the fluid in the radial direction thereof.

A boundary between the first segment 41 and the second segment 42 may alternatively be stated to occur along a plane defined by a circumferential extension of an intersection between the outer circumferential surface 33 and the axial end surface 32 of the rotary valve body 20, such as may be formed by a circumferentially extending edge formed therebetween. The boundary may alternatively be said to be formed by a plane defined by the axial end surface 32 of the rotary valve body 20 or the first passageway port 25 formed co-planar with the axial end surface 32.

The axial end wall 68 of the valve housing 60 defines each of a valve seating surface 45 and an indented surface 46 for delimiting the opening 67 of the valve housing 60 in the axial direction towards the second end 62 thereof. The valve seating surface 45 forms a portion of the inner surface of the valve housing 60 against which the axial end surface 32 of the rotary valve body 20 is engaged, hence the axial end surface 32, the valve seating surface 45, and the first passageway port 25 may all be arranged substantially co-planar to one another. The boundary present between the segments 41, 42 may accordingly be alternatively stated to occur along the plane defined by the valve seating surface 45.

The indented surface 46 is indented axially towards the second end 62 of the valve housing 60 relative to the adjacent valve seating surface 45. The indented surface 46 extends axially away from the valve seating surface 45 towards the second end 62 about a perimeter 47 of the indented surface 46, which corresponds to a perimeter of the second segment 42 when viewed from the axial direction of the rotary valve body 20. The perimeter 47 of the indented surface 46 is shown as including convexly shaped transition regions 48 where the indented surface 46 first begins to curve or incline away from the plane defined by the valve seating surface 45 and towards the axial direction. Such transition regions 48 may be arcuate in shape or may include one or more bevels, as desired. In other embodiments, the perimeter 47 of the indented surface 46 may include a sharp edge between the valve seating surface 45 and an axially extending portion of the indented surface 46 intersecting the valve seating surface 45, as desired. The manner in which the perimeter 47 of the indented surface 46 is formed at an intersection with the valve seating surface 45 also results in the boundary present between the segments 41, 42 being alternatively stated to occur along the plane defined by the perimeter 47 of the indented surface 46.

The first segment 41 is further delimited in the circumferential direction of the rotary valve body 20 by one of the radial wall segments 71 and/or one of the sealing elements 90 in each opposing circumferential direction, thereby preventing circumferential flow of the fluid to the remaining housing ports 82, 83. As best shown in FIGS. 3 and 4, the first segment 41 of the flow path 40 includes a cross-sectional flow shape corresponding to an angular segment of an annulus when viewed from the axial direction. This shape is continued axially from the position of the first housing port 81 to the boundary between the segments 41, 42 for communicating the fluid axially at positions directly between the outer circumferential surface 33 and the inner circumferential surface 70.

Figure 2:
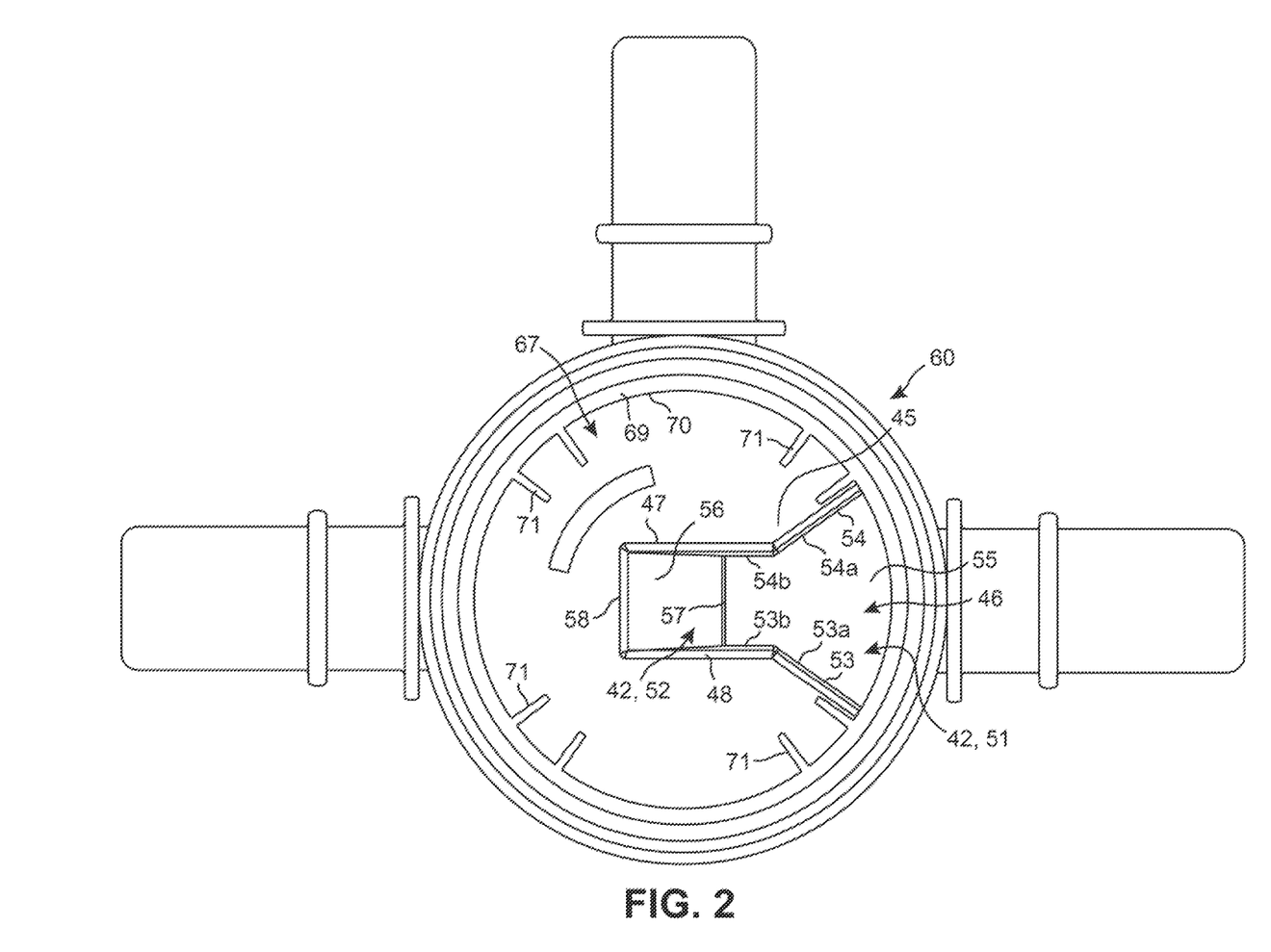
FIG. 2 is a top plan view of a valve housing of the rotary valve shown in isolation.

As best shown in FIG. 2 (which shows the valve housing 60 in isolation), the second segment 42 as defined by the indented surface 46 of the axial end wall 68 extends radially inwardly from the end of the first segment 41 towards the central axis of the valve housing 60, which also corresponds to the axis of rotation of the rotary valve body 20 when received therein. The second segment 42 may include a radial outer portion 51 and a radial inner portion 52. At least a portion of the radial outer portion 51 is axially aligned with the first segment 41, whereas the radial inner portion 52 is disposed radially inwardly of the first segment 41.

The radial outer portion 51 includes a cross-sectional flow area of the second segment 42 decreasing as the second segment 42 progresses radially inwardly towards the axis of rotation of the rotary valve body 20. The decrease in cross-sectional flow area of the second segment 42 may include an inward tapering of the radial outer portion 51 towards the axis of rotation of the rotary valve body 20 and the corresponding first passageway port 25 thereof, wherein such inward tapering is shown as occurring with respect to a direction arranged perpendicular to each of the radial direction of extension of the second segment 42 and the axial direction of the rotary valve body 20. The inward tapering of the radial outer portion 51 results in the radial outer portion 51 having a profile shape of a truncated sector of a circle when viewed from the axial direction of the valve housing 60.

The radial inner portion 52 of the second segment 42 includes a cross-sectional flow area of the second segment 42 decreasing as the second segment 42 progresses away from the first segment 41. In contrast to the radial outer portion 51, the radial inner portion 51 includes an inward tapering of the second segment 42 with respect to the axial direction of the rotary valve body 20, which includes the indented surface 46 inclining towards the first passageway port 25 for directing the fluid into or out of the passageway 24. The radial inner portion 52 includes a rectangular profile shape when viewed from the axial direction of the valve housing 60.

The described second segment 42 of the flow path 40 is defined by the indented surface 46 as follows. The indented surface 46 includes a first lateral surface 53, an opposing second lateral surface 54, and a base surface 55 connecting the opposing lateral surfaces 53, 54. Each of the lateral surfaces 53, 54 extends at least partially in the axial direction of the valve housing 60 to space the base surface 55 axially from the planar boundary present between the segments 41, 42. The base surface 55 forms an axially distal surface of the second segment 42 and may be arranged substantially perpendicular to the axis of rotation of the rotary valve body 20, which corresponds to the base surface 55 extending along a radially extending plane. Each of the lateral surfaces 53, 54 is shown as extending primarily in the axial direction at an angle perpendicular to the valve seating surface 45 and the base surface 55, but alternative inclinations may be utilized in connecting the lateral surfaces 53, 54 to the base surface 55. Additionally, each of the lateral surfaces 53, 54 may be concave in shape when connecting the base surface 55 to the adjacent valve seating surface 45, such as including a substantially arcuate shape or beveled shape.

The first lateral surface 53 includes an inclined segment 53a and parallel segment 53b and the second lateral surface 54 similarly includes an inclined segment 54a and a parallel segment 54b. Each of the inclined segments 53a, 54a is inclined relative to the radial direction of extension of the second segment 42 with the inclined segments 53a, 54a defining the inward tapering of the radial outer portion 51 of the second segment 42. In contrast, each of the parallel segments 53b, 54b is arranged parallel to the radial direction of extension of the second segment 42, wherein the parallel segments 53b, 54b define the lateral surfaces of the radial inner portion 52.

The base surface 55 transitions to an inclined surface 56 as the base surface 55 progresses radially inwardly towards the axis of rotation. The inclined surface 56 is shown as a ramp surface arranged at an incline with respect of each of the radial direction of extension of the second segment 42 and the axial direction of the rotary valve body 20. As mentioned above, the inclined surface 56 is arranged to promote a turning of the fluid between the radial and axial directions, and is accordingly inclined towards the first passageway port 25. The inclined surface 56 may deviate from the base surface 55 at an edge 57 and may terminate at a distal end 58 thereof, which is spaced distally from the first segment 41. The inclined surface 56 is positioned to be at least partially in axial alignment with the first passageway port 25, and may be axially aligned with the axis of rotation of the rotary valve body 20.

As can best be seen in FIGS. 3 and 4, the distal end 58 of the inclined surface 56 may be disposed substantially tangential to the perimeter of the first passageway port 25 in a manner wherein the distal end 58 meets the axial end surface 32 of the rotary valve body 20 at this position. However, in other embodiments, the distal end 58 of the inclined surface 56 may be spaced apart from the shown position to be disposed in axial alignment with the first passageway port 25, such as extending laterally across the first passageway port 25 while crossing the axis of rotation of the rotary valve body 20.

The edge 57 at which the inclined surface 56 deviates from the base surface 55 is also shown as being formed adjacent a diametrically opposed portion of the first passageway port 25 in comparison to the distal end 58, thereby causing the axial turning of the fluid shortly after becoming axially aligned with the first passageway port 25. However, the edge 57 may be positioned alternatively, the base surface 55 may be spaced axially a different distance from the boundary between the segments 41, 42, or an angle of inclination of the inclined surface 56 may be varied from those shown to prescribe the desired transition of the fluid between the second segment 42 and the passageway 24.

The radial outer portion 52 of the second segment 42 may include a width as measured in the lateral direction arranged perpendicular to the radial direction and the axial direction that substantially corresponds to a width (inner diameter) of the circular first passageway port 25 where the second segment 42 intersects the first passageway port 25. The described width may be measured between the opposing parallel segments 53b, 54b of the lateral surfaces 53, 54. The matching of such widths ensures a smooth transition of the flow area from the second segment 42 to the passageway 24 via the first passageway port 25.

Referring again to FIGS. 3 and 4, a method of operation of the rotary valve 10 is described wherein the first housing port 81 forms an inlet into the valve housing 60 and the rotary valve body 20 is selectively rotated to determine a distribution of a corresponding fluid from the passageway 24 to one of the second housing port 82 and/or the third housing port 83, each of which forms an outlet out of the valve housing 60. The fluid enters the conduit 85 associated with the first housing port 81 and flow into the first segment 41 of the flow path 40 while flowing in a radial inward direction of the rotary valve body 20. The flow of the fluid is caused to turn axially towards the second end 62 of the valve housing 20 within the first segment 41 after exiting the first housing port 81. The fluid continues to flow axially until the fluid cross the axial boundary present between the first segment 41 and the second segment 42. The axially flow is then caused to turn towards the radial inward direction of the rotary valve body 20 once again. The fluid is collected within the radial outer portion 51 where the fluid encounters a reduction in cross-sectional flow area as the fluid progresses towards the first passageway port 25 due to the inward tapering of the radial outer portion 51. The fluid continues towards the first passageway port 25 where the fluid is turned from the radial inward direction to the axial direction towards the first end 61 of the valve housing 60 via the fluid encountering the inclined surface 56. The fluid then enters the passageway 24 axially via the first passageway port 25. The fluid then undergoes another turn to flow radially outwardly towards the second passageway port 26.

As shown in FIGS. 3 and 4, an instantaneous rotational position of the rotary valve body 20 relative to the valve housing 60 determines which of the second and third housing ports 82, 83 is instantaneously aligned with the second passageway port 26 of the rotary valve body 20 for providing fluid communication therebetween. Specifically, FIG. 3 shows the passageway 24 as being in fluid communication with the second housing port 82 while FIG. 4 shows the passageway 24 in fluid communication with the first housing port 83 via a 90 degree rotation of the rotary valve body 20.

Each circumstance includes the fluid undergoing the same number of 90 degree turns while traversing the same flow distance, hence either described mode of operation results in a similar effect on the fluid when reaching the corresponding one of the housing ports 82, 83.

Although not pictured, the rotary valve body 20 may be further adjustable to additional positions corresponding to conditions such as the second passageway port 26 not being aligned with either of the housing ports 82, 83 for closing off flow through the rotary valve 10, the second passageway port 26 being aligned with multiple ports 82, 83 for distributing the fluid to the multiple ports 82, 83, or only partially aligned with one of the ports 82, 83 for prescribing a desired flow reduction or the like in the fluid when entering the corresponding one of the ports 82, 83, as desired. The rotary valve 10 is also not limited to the described flow direction, as the fluid may alternatively pass through the rotary valve 10 in the opposing flow direction to those shown and described without necessary departing from the scope of the present invention. As should be understood, each flow reduction or expansion is reversed in comparison to the described and illustrated flow configuration.

The rotary valve 10 as shown and described advantageously allows each of the housing ports 81, 82, 83 to be positioned on a common plane such that axially extending conduits and fluid fittings can be eliminated from the rotary valve 10 construction. The elimination of such features substantially reduces an axial dimension of the rotary valve 10, which in turn allows for the rotary valve 10 to more easily be adapted to limited packaging spaces within certain applications, such as automotive or vehicular applications.

Figure 5:
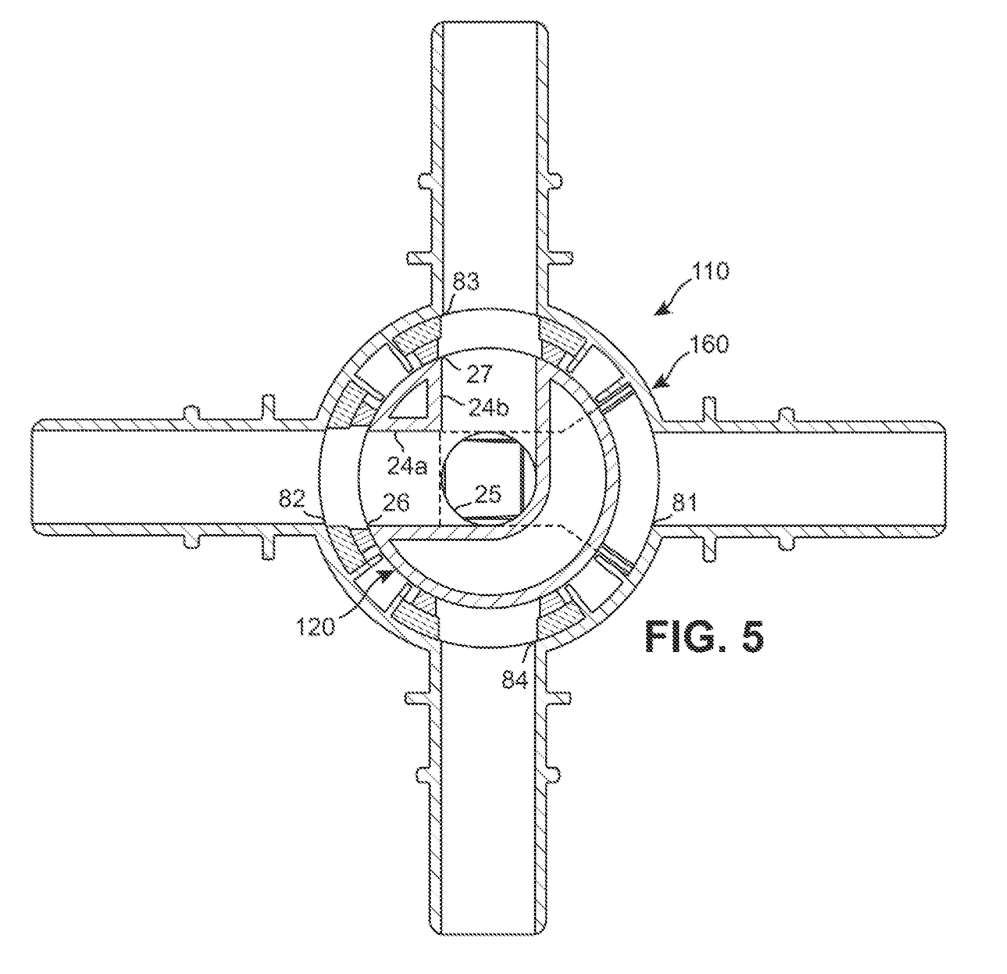
FIG. 5 is a cross-sectional view of a modified rotary valve having an additional housing port and a multi-passage rotary valve body according to another embodiment of the present invention.

Referring now to FIG. 5, a modified rotary valve 110 according to another embodiment of the present invention is disclosed. The rotary valve 110 is substantially identical to the rotary valve 10 except for the addition of a fourth housing port 84 and a branching of a passageway formed within a rotary valve body 120 to include a first passageway branch 24a leading to the second passageway port 26 and a second passageway branch 24b leading to a third passageway port 27 angularly offset from the second passageway port 26. The flow path formed through the valve housing 160 may be identical to that disclosed with reference to the rotary valve 10, hence further description thereof is omitted.

The disclosed rotary valve 110 includes the ability to place the first passageway port 25 in fluid communication with any adjacent pair of the housing ports 82, 83, 84 via axial alignment of each of the second and third passageway ports 26, 27 therewith. The rotary valve 110 may also include the replacement of the modified rotary valve body 120 having two outlet ports 26, 27 with the rotary valve body 20 having the single outlet port 26, thereby allowing for the single outlet port 26 to be selectively placed in alignment and hence fluid communication with any of the three different outlet housing ports 82, 83, 84. It should be readily apparent to one skilled in the art that the general concepts disclosed with reference to the rotary valve 10 and the modified rotary valve 110 may be applied to substantially any number of housing ports, any number of circumferentially positioned passageway ports, and any configuration of such ports relative to one another so long as the continuous flow path as disclosed herein allows for the fluid to flow from the circumferential position to the axial positon within the corresponding valve housing in the manner described.

Figure 6:
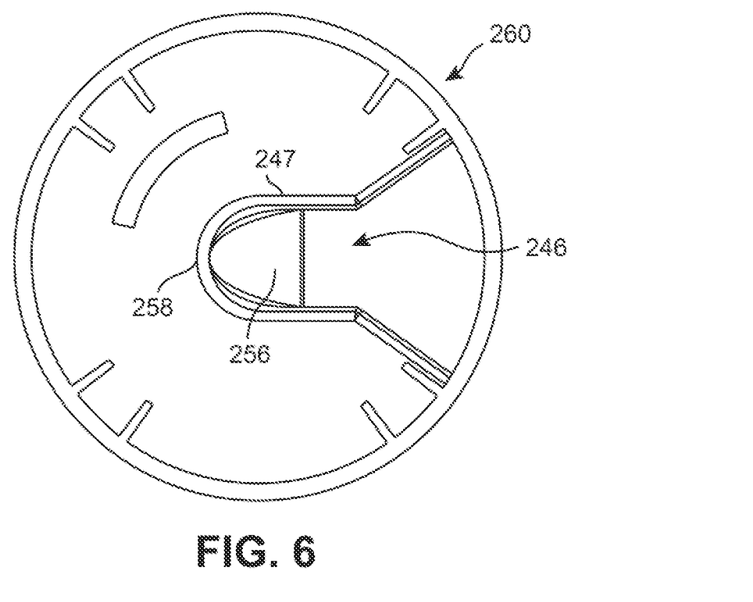
FIG. 6 is fragmentary top plan view showing a portion of a modified valve housing having a semi-circular flow path outlet according to another embodiment of the present invention.

Referring now to FIG. 6, a valve housing 260 having a modified perimeter 247 of the indented surface 246 thereof is disclosed. In contrast to the linear distal end 58 of the inclined surface 56 shown in FIG. 2, FIG. 6 illustrates the distal end 258 of the inclined surface 256 as having a semi-circular shape corresponding to an axially aligned portion of the perimeter of the first passageway port 25. The indented surface 246 accordingly includes at least a portion of the perimeter 247 thereof being axially aligned with, overlaying, and matching at least a portion of the first passageway port 25 for a more direct axial passage of the fluid between the flow path 40 and the first passageway port 25.

Figure 7:
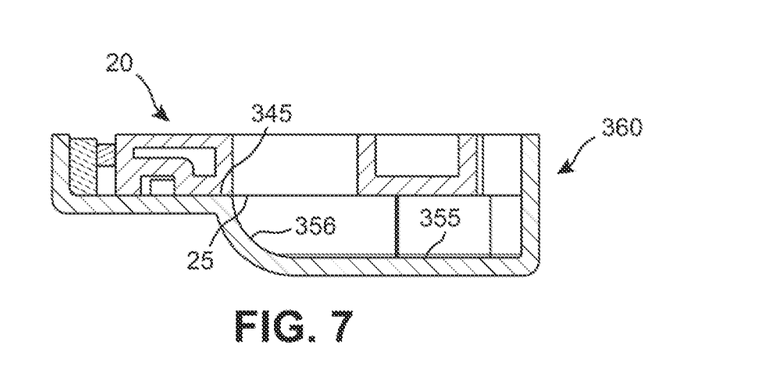
FIG. 7 is a fragmentary cross-sectional elevational view of a rotary valve having a modified valve housing according to another embodiment of the present invention, wherein a flow path includes an arcuate inclined surface.

Referring now to FIG. 7, a valve housing 360 having a modified inclined surface 356 adjacent the first passageway port 25 is disclosed. Instead of an inclined and planar ramp-like surface, the inclined surface 356 is concave in shape to connect the planar base surface 355 to the adjacent valve seating surface 345 via a curved surface. The curved surface may aid in more smoothly turning the flow of air passing into the first passageway port 25 when being redirected from the radial direction to the axial direction. FIG. 7 also depicts the use of a sharp edge where the surfaces of the indented surface intersect the valve seating surface 345, as opposed to the curved transition regions 48 shown with respect to FIGS. 1-4.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A rotary valve comprising:
   a rotary valve body configured to rotate about an axis of rotation thereof, the rotary valve body defining a passageway therethrough, the passageway extending from a first passageway port formed at an axial end surface of the rotary valve body to a second passageway port formed at an outer circumferential surface of the rotary valve body; and
   a valve housing having an inner surface defining each of an opening rotatably receiving the rotary valve body therein, a first housing port providing an inlet or outlet for a fluid to flow into or out of the opening of the valve housing while flowing transverse to the axis of rotation of the rotary valve body, and a second housing port providing an inlet or outlet for the fluid to flow into or out of the opening of the valve housing while flowing transverse to the axis of rotation of the rotary valve body, wherein a flow path is formed between the inner surface of the valve housing and the outer surface of the rotary valve body, the flow path providing fluid communication between the first housing port of the valve housing and the first passageway port of the rotary valve housing, wherein at least a portion of the flow path is defined between an axially indented surface of the valve housing and the outer surface of the rotary valve body.

2. The rotary valve of claim 1, wherein the flow path includes the fluid flowing in each of an axial direction arranged parallel to the axis of rotation of the rotary valve body and a radial direction of the rotary valve body as defined by the axis of rotation thereof.

3. The rotary valve of claim 1, wherein at least a portion of the flow path is defined between the outer circumferential surface of the rotary valve body and the inner surface of the valve housing.

4. The rotary valve of claim 1, wherein at least a portion of the flow path is defined between an inner circumferential surface of the valve housing and the outer surface of the rotary valve body.

5. The rotary valve of claim 1, wherein the first passageway port is centered relative to the axis of rotation of the rotary valve body.

6. The rotary valve of claim 1, further comprising a sealing assembly disposed between the outer circumferential surface of the rotary valve body and the inner surface of the valve housing at the position of the second housing port.

7. The rotary valve of claim 1, wherein the flow path includes a first segment and a second segment, wherein the first segment extends in an axial direction of the rotary valve body between the first housing port and the second segment, and wherein the second segment extends in a radial direction of the rotary valve body as defined by the axis of rotation thereof between the first segment and the first passageway port.

8. The rotary valve of claim 7, wherein the first segment is disposed directly radially outwardly of the outer circumferential surface of the rotary valve body with respect to the radial direction of the rotary valve body.

9. The rotary valve of claim 8, wherein the first segment is disposed to a first side of a first plane defined by the axial end surface of the rotary valve body and the second segment is disposed to a second side of the first plane.

10. The rotary valve of claim 7, wherein the second segment includes a decreasing cross-sectional flow area as the second segment extends radially inwardly towards the axis of rotation of the rotary valve body.

11. The rotary valve of claim 7, wherein the second segment is inclined axially towards the first passageway port.

12. The rotary valve of claim 1, wherein a width of the flow path matches a width of the first passageway port where the flow path intersects the first passageway port.

13. The rotary valve of claim 1, wherein the valve housing is devoid of an opening through an axial end wall of the valve housing for providing fluid communication between the passageway and an exterior of the valve housing.

14. A rotary valve comprising:
a rotary valve body configured to rotate about an axis of rotation thereof, the rotary valve body defining a passageway therethrough, the passageway extending from a first passageway port formed at an axial end surface of the rotary valve body to a second passageway port formed at an outer circumferential surface of the rotary valve body; and
a valve housing having an inner surface defining each of an opening rotatably receiving the rotary valve body therein, a first housing port providing an inlet or outlet for a fluid to flow into or out of the opening of the valve housing while flowing transverse to the axis of rotation of the rotary valve body, and a second housing port providing an inlet or outlet for the fluid to flow into or out of the opening of the valve housing while flowing transverse to the axis of rotation of the rotary valve body, wherein a flow path is formed between the inner surface of the valve housing and the outer surface of the rotary valve body, the flow path providing fluid communication between the first housing port of the valve housing and the first passageway port of the rotary valve housing, wherein the first housing port is always in fluid communication with the passageway via the flow path and the first passageway port.

15. The rotary valve of claim 14, wherein the second passageway port selectively provides fluid communication between the second housing port and the passageway depending on a rotational position of the rotary valve body relative to the valve housing.

16. The rotary valve of claim 15, further comprising a third housing port providing an inlet or outlet for the fluid to flow into or out of the opening of the valve housing while flowing transverse to the axis of rotation of the rotary valve body, wherein the second passageway port selectively provides fluid communication between the third housing port and the passageway depending on the rotational position of the rotary valve body relative to the valve housing.

17. The rotary valve of claim 16, wherein a first plane arranged perpendicular to the axis of rotation of the rotary valve body passes through each of the first housing port, the second housing port, and the third housing port.

18. The rotary valve of claim 17, wherein each of a central axis of the first housing port, a central axis of the second housing port, and a central axis of the third housing port is disposed on the first plane.

19. A rotary valve comprising:
a rotary valve body configured to rotate about an axis of rotation thereof, the rotary valve body defining a passageway therethrough, the passageway extending from a first passageway port formed at an axial end surface of the rotary valve body to a second passageway port formed at an outer circumferential surface of the rotary valve body; and
a valve housing having an inner surface defining each of an opening rotatably receiving the rotary valve body therein, a first housing port providing an inlet or outlet for a fluid to flow into or out of the opening of the valve housing while flowing transverse to the axis of rotation of the rotary valve body, and a second housing port providing an inlet or outlet for the fluid to flow into or out of the opening of the valve housing while flowing transverse to the axis of rotation of the rotary valve body, wherein a flow path is formed between the inner surface of the valve housing and the outer surface of the rotary valve body, the flow path providing fluid communication between the first housing port of the valve housing and the first passageway port of the rotary valve housing, wherein at least a portion of the flow path is defined between the axial end surface of the rotary valve body and the inner surface of the valve housing.

* * * * *